United States Patent [19]

Barnard

[11] 4,228,923

[45] Oct. 21, 1980

[54] ICE MAKER DISPENSER STRUCTURE

[75] Inventor: Walter C. Barnard, White Bear Lake, Minn.

[73] Assignee: Whirlpool Corporation, Benton Harbor, Mich.

[21] Appl. No.: 67,536

[22] Filed: Aug. 17, 1979

[51] Int. Cl.[3] .............................................. B65G 65/48

[52] U.S. Cl. .................................. 222/52; 222/146 C; 222/153; 222/235; 62/344

[58] Field of Search ........... 222/74, 75, 146 R, 146 C, 222/52, 153, 226, 233, 234, 235, 148; 62/344; 141/351

[56] References Cited

U.S. PATENT DOCUMENTS

| | | | |
|---|---|---|---|
| 1,738,701 | 12/1929 | Hanna . | |
| 2,969,650 | 1/1961 | Eschenburg et al. . | |
| 2,997,860 | 8/1961 | Muffly . | |
| 3,127,061 | 3/1964 | Patch et al. | 222/74 |
| 3,308,632 | 3/1967 | Winfield . | |
| 3,317,082 | 5/1967 | Ohlsson et al. . | |
| 3,329,223 | 7/1967 | Swanson et al. . | |
| 3,330,129 | 7/1967 | Halverson et al. | 222/75 |
| 3,517,860 | 6/1970 | Whalen . | |
| 3,874,559 | 4/1975 | Pink | 222/146 C |
| 4,139,126 | 2/1979 | Krasner | 222/146 C |

*Primary Examiner*—Allen N. Knowles
*Attorney, Agent, or Firm*—Wegner, Stellman, McCord, Wiles & Wood

[57] ABSTRACT

An ice maker dispenser structure wherein a removable chute is provided as a portion of a discharge duct leading from a discharge opening in a collecting bin for storing a plurality of discrete ice bodies to be dispensed. An agitator is disposed within the collecting bin adjacent the discharge opening and is operated to agitate the ice bodies adjacent the opening when a closure member is removed from the opening to effect the dispensing operation. An interlock is provided for preventing movement of the closure member away from the discharge opening in the event the chute is removed from the ice maker such as for servicing of the chute, thereby preventing injury to the user's fingers which may inadvertently be passed inwardly through the discharge opening into contact with the operating agitator.

14 Claims, 4 Drawing Figures

FIG. 1
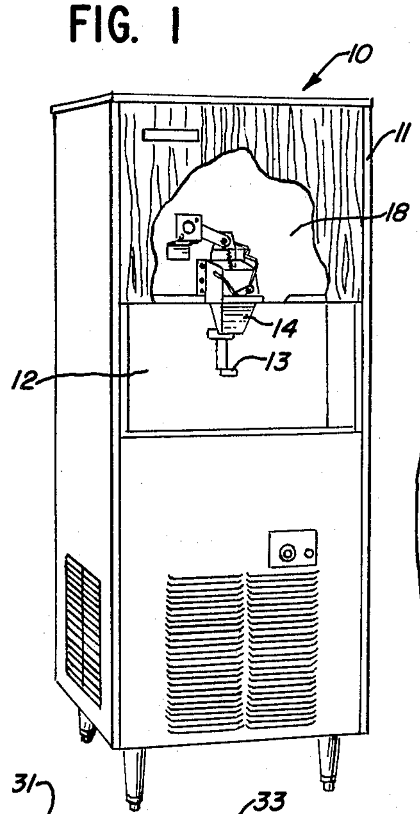
FIG. 2
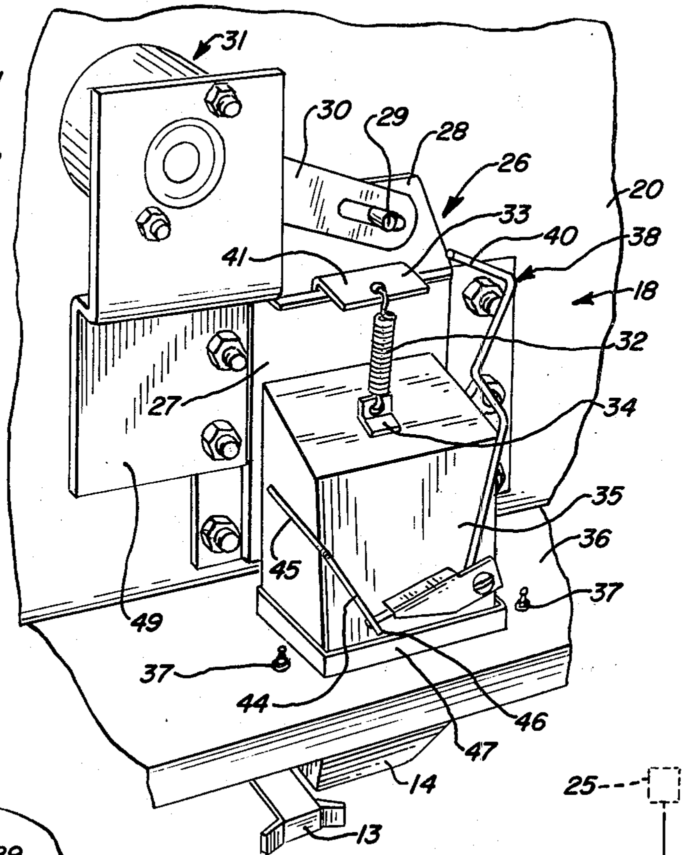
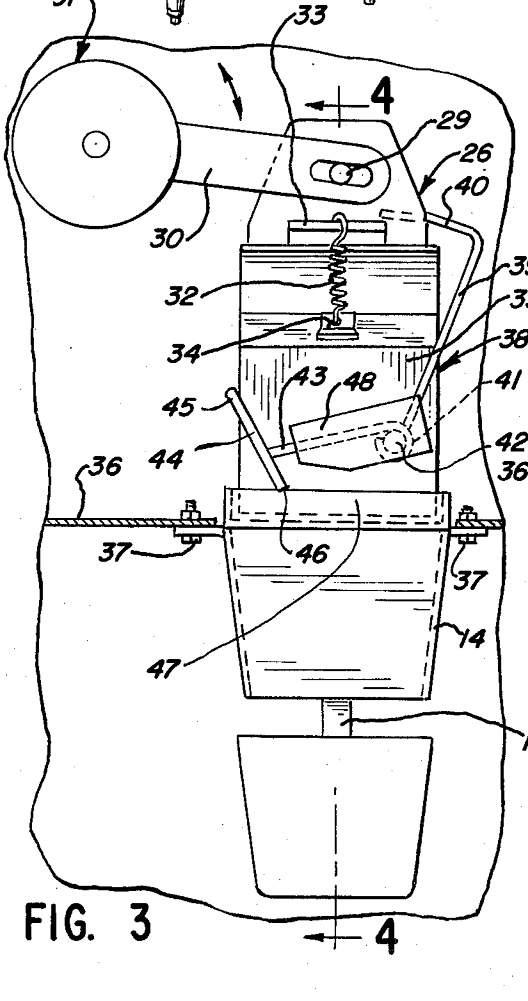
FIG. 3
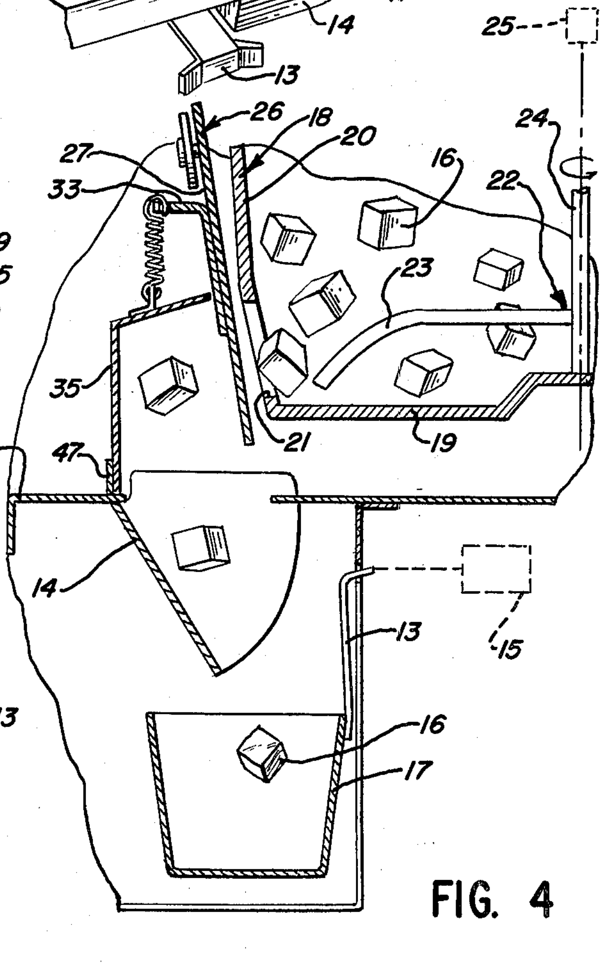
FIG. 4

ICE MAKER DISPENSER STRUCTURE

BACKGROUND OF THE INVENTION

1. Field of the Invention

This invention relates to ice maker structures and in particular to dispensing means for use in automatic ice body makers.

2. Description of the Background Art

In one improved form of ice body maker, ice bodies are delivered to a storage receptacle having a discharge opening in a lower portion thereof. A closure member is movably disposed across the discharge opening so as to close the opening between dispensing operations. A suitable mechanism for moving the closure member away from the opening is provided for selectively effecting such movement to cause a dispensing of the ice bodies outwardly through the discharge opening. At the same time, the agitator is operated so as to maintain the ice bodies freeflowing in the dispensing operation.

It is further conventional to provide in such ice body dispenser a duct for conducting the ice bodies from the discharge opening to a dispensing position. Conventionally, a lower portion of the duct is removably mounted in the apparatus so as to permit maintenance and the like.

A problem arises in such a structure in that the discharge opening is accessible to the user's fingers upon removal of the chute. Thus, should the user insert his fingers through the discharge opening and into the path of the agitator under such conditions, the user's fingers could be injured by the operation of the agitator. The present invention is concerned with means for preventing such injury.

Relative to the background art, an ice dispenser having such an agitator and discharge opening closure means is disclosed in U.S. Letters Pat. No. 3,517,860 of James M. Whalen.

A liquid dispensing apparatus is shown in U.S. Letters Pat. No. 1,738,701 of John P. Hanna wherein a valve actuating device includes a lever arranged to be engaged and actuated by a portion of a nozzle which is inserted through an opening.

William A. Eschenburg et al show in U.S. Letters Pat. No. 2,969,650 an ice making and vending machine having means for continuously moving the ice bodies to prevent coherence or fusing therebetween.

Glenn Muffly, in U.S. Letters Pat. No. 2,997,860 shows an ice making and refrigerating system wherein ice bodies are collected in a box externally of the ice maker apparatus. A chute assembly is pivotally mounted so as to be selectively positioned to close the ice outlet opening of the cabinet. The closure means includes a thermostat device which operates to stop further ice making operation when ice accumulates adjacent thereto.

An ice maker with a door mounted bin is shown in U.S. Letters Pat. No. 3,308,632 of Howard E. Winfield, Jr. The ice maker thereof includes a movable receptacle on the door of the refrigeration apparatus and associated control means operative to stop the operation of the ice maker when the door is opened or when the receptacle is removed.

Leonard W. Ohlsson et al in U.S. Letters Pat. No. 3,317,082, which patent is owned by the assignee hereof, show a product and bag dispenser having improved control means for controlling the operation of the ice delivery means including means for preventing dispensing of ice bodies when the bag supply is below a preselected minimum.

In U.S. Letters Pat. No. 3,329,223 of Donald F. Swanson et al, which patent is also owned by the assignee hereof, an ice maker dispenser control is shown to include a conveyor for moving collected ice bodies toward the outlet in a dispensing operation.

SUMMARY OF THE INVENTION

The present invention comprehends an improved ice maker dispenser having means for preventing injury to the user's fingers as upon removal of a removable portion of the ice body duct means in such an ice maker apparatus.

More specifically, the present invention comprehends an improved ice maker dispensing means wherein interlock means are provided for causing the discharge opening in the ice collecting receptacle to be maintained closed upon the removal of the removable duct means.

The interlock means may comprise mechanical interlock means having one portion responsive to mounting of the removable duct means in position in the ice maker apparatus to permit controlled movement of the closure member controlling the discharge opening.

Upon removal of the removable duct means, the interlock means may dispose a portion thereof in blocking relationship to the closure member so as to prevent movement of the closure member away from the discharge opening closing disposition.

In the illustrated embodiment, the interlock means comprises an interlock member which is pivotally mounted to a portion of the duct means.

The closure member may be biased to a position closing the discharge opening and in the illustrated embodiment, is biased by a spring connected between the closure member and a portion of the duct means.

The improved dispensing means of the present invention is extremely simple and economical of construction while yet providing the highly desirable features discussed above.

BRIEF DESCRIPTION OF THE DRAWING

Other features and advantages of the invention will be apparaent from the following description taken in connection with the accompanying drawing wherein:

FIG. 1 is a perspective view of an ice maker having dispensing structure embodying the invention, with a portion of the apparatus broken away to illustrate the disposition of the dispensing means therein;

FIG. 2 is a fragmentary perspective view of the ice maker structure of the invention;

FIG. 3 is a fragmentary front elevation of the dispensing means; and

FIG. 4 is a fragmentary vertical section taken substantially along the line 4—4 of FIG. 3.

DESCRIPTION OF THE PREFERRED EMBODIMENT

In the exemplary embodiment of the invention as disclosed in the drawing, an ice maker generally designated 10 is shown to include an outer cabinet 11 defining a front opening dispensing space 12 provided with a dispensing switch actuator 13 subjacent a chute 14. The dispensing switch actuator may be suitably connected to a control 15, schematically shown in dotted lines in FIG. 4, for controlling a dispensing operation wherein ice bodies 16 are dispensed into a suitable receiver, such as cup 17, through the chute 14 as an incident of the cup being urged against the dispensing switch actuator 14, as illustrated in FIGS. 3 and 4.

Ice bodies 16 may be formed within the apparatus 10 by suitable ice body making apparatus, which illustratively includes a collecting receptacle 18 wherein the discrete formed ice bodies 16 are collected for subsequent delivery therefrom in the dispensing operation.

More specifically, as shown in FIG. 4, the collecting receptacle defines a bottom wall 19 and an upstanding sidewall 20. The sidewall is provided with a discharge opening 21 adjacent the bottom wall 19. An agitator generally designated 22 is provided within the receptacle and includes a plurality of agitator blades 23 rotated about a vertical axis in the receptacle by a suitable driven shaft 24. The agitator causes the ice bodies collected in the receptacle 18 to be maintained separated so as to permit facilitated movement of the ice bodies outwardly through the discharge opening 21 in the dispensing operation. The agitator may be driven by a suitable electric motor 25, illustrated schematically in FIG. 4, the operation of which is controlled by the control switch mechanism 15, so that the agitator is caused to agitate the ice bodies in the receptacle continuously during each dispensing operation.

Between dispensing operations, the discharge opening 21 is preferably maintained closed and, for this purpose, a closure means generally designated 26 is provided. The closure means includes a closure member 27 which, as shown in FIG. 4, may comprise a flat plate selectively disposable across the discharge opening 21 in a closed disposition thereof.

As shown in FIGS. 2 and 3, the closure member includes an upper portion 28 provided with a connecting pin 29 which is vertically reciprocated by a slotted arm 30 of a rotary solenoid 31 mounted on a bracket 49 on sidewall 20 of the receptacle. Solenoid 31 is also connected to the control switch 15 so as to be energized during each dispensing operation, thereby moving the closure member 27 to a raised position opening the discharge opening 21 for delivery of the agitated ice bodies 16 therethrough.

The closure member 27 may be biased to the closed position illustrated in FIGS. 2, 3 and 4 by a spring 32 which may be connected between a bracket 33 fixed to the closure member 27, and a bracket 34 carried on a fixed duct 35 mounted to a shelf 36 of the apparatus 10 and defining a portion of the guide means for conducting the ice bodies delivered through the discharge opening 21 to the chute and into the receiving container 17, as illustrated in FIG. 4.

As indicated briefly above, chute 14 is removably carried in the ice maker apparatus so as to permit facilitated maintenance thereof and the like. As illustrated in FIG. 4, the chute may be secured to the shelf 36 by suitable threaded securing means, such as screws 37. Thus, chute 14 effectively defines a removable portion of the duct means for conducting ice bodies from the discharge opening 21 downwardly into the receiving container 17. The disposition of the chute subjacent the duct portion 35 effectively prevents the user from inserting his fingers upwardly through the duct portion 35 and through the opening 21 into the receptacle 18. However should the chute 14 be removed for any reason, the opening 21 becomes accessible to the user's fingers, as may be seen with reference to FIG. 4. Thus, should the user inadvertently depress the dispensing switch actuator 13 while his fingers are extended upwardly through the opening 21 into the receptacle 18, operation of the agitator 22 could cause injury to the user's fingers by engagement thereof with the agitator blades 23. To prevent such injury, an improved interlock means generally designated 38 is provided for preventing exposure of the discharge opening 21 when the chute 14 is removed from the apparatus.

More specifically, as shown, interlock 38 includes a bent rod member 39 having an upper turned end portion 40 which may be selectively disposed in the path of movement of the bracket 33 so as to prevent raising of the closure member 27 and thereby maintain the discharge opening 21 closed.

As shown in FIG. 3, the rod member 39 includes a midportion 41 pivotally turned about a pivot 42 carried by duct 35. The rod member includes a second portion 43 extending away from pivot 42 and provided at its distal end with a stop rod 44 having a turned end portion 45 extending rearwardly along the side of the duct 35. The lower end 46 of the rod 44 is engaged by an upstanding flange 47 on the removable chute 14 extending upwardly through the shelf 36 when the chute is installed in the ice maker, as shown in FIG. 3.

Control rod portion 43 may be provided with a counterweight member 48 so as to gravity-bias the rod member in a counterclockwise direction about pivot 42.

Thus, as shown in FIG. 2, when the chute 14 is installed in the ice maker apparatus, the flange 47 pivots the rod member 39 in a clockwise direction so as to cause the end 40 thereof to be spaced laterally from the path of movement of bracket 33 on the closure member 27. Thus, normal operation of the ice maker may be effected. More specifically, concurrent operation of the rotary solenoid 31 and agitator motor 25 by the depression of the dispensing switch actuator 13 as by cup 17 causes the closure member 27 to be raised, thereby opening the discharge opening 21 and permitting the ice bodies to be dispensed outwardly therethrough under the agitating action of agitator blade 23.

When, however, chute 14 is removed from the apparatus for any reason, the removal of flange 47 from engagement with the lower end 46 of control rod portion 44 permits the counterweight 48 to pivot the control rod in a counterclockwise direction so as to bring the rod end 40 into overlying relationship with the bracket 33, as illustrated in broken lines in FIG. 3, thereby effectively preventing upward movement of the closure member in the event the actuator 13 is depressed, notwithstanding the energization of the rotary solenoid 31. Thus injury to a user's fingers which may be inserted upwardly through the duct 35 is effectively prevented by maintaining the discharge opening 21 closed as an incident of removal of the chute 14 from the ice maker apparatus.

Reinstallation of chute 14 in the apparatus automatically re-establishes the operating arrangement of the closure member as an incident of the flange 47 thereof repivoting the control rod member 39 to the counterclockwise retracted disposition of FIG. 2 out of the path of movement of bracket 33. Thus, normal operation of the ice maker apparatus dispensing means is automatically effected upon remounting of the chute 14 in the apparatus, as seen in FIG. 2.

The improved safety interlock means of the present invention is extremely simple and economical of construction while yet providing effectively positive prevention of injury to a user's fingers inadvertently inserted through the duct portion 35 when the chute portion 14 is removed for any reason.

The foregoing disclosure of specific embodiments is illustrative of the broad inventive concepts comprehended by the invention.

I claim:

1. In an ice maker having a storage receptacle for holding a plurality of discrete ice bodies having a discharge opening, agitating means in the receptacle for agitating the ice bodies adjacent the discharge opening to promote free delivery of the ice bodies through the discharge opening during a dispensing operation, closure means for selectively closing the discharge opening, means for removing the closure means from said opening and concurrently energizing the agitating means to effect a delivery of ice bodies therethrough, and guide means for conducting delivered ice bodies from said opening to a dispense position, at least a portion of said guide means comprising removable means, said discharge opening being accessible to a user's fingers upon removal of said removable means, the improvement comprising:

means responsive to removal of said removable means of the guide means to prevent removal of the closure means from said opening thereby to prevent injury to said user's fingers by said agitating means during an attempted dispensing operation.

2. The ice maker structure of claim 1 including means for biasing said closure means to close said discharge opening and powered means for removing said closure means from said discharge opening.

3. The ice maker structure of claim 1 wherein said removable means of the guide means comprises a chute.

4. The ice maker structure of claim 1 wherein said means to prevent removal of the closure means from said opening comprises a mechanical interlock.

5. The ice maker structure of claim 1 wherein said means to prevent removal of the closure means from said opening comprises a mechanical interlock positioned as an incident of removal of said removable means of the guide means to block movement of the closure means from said discharge opening.

6. The ice maker structure of claim 1 wherein said means to prevent removal of the closure means from said opening comprises a pivotally mounted mechanical interlock.

7. The ice maker structure of claim 1 wherein said means to prevent removal of the closure means from said opening comprises a pivotally mounted mechanical interlock and means for biasing said interlock to block said movement of the closure means.

8. In an ice maker having a storage receptacle for holding a plurality of discrete ice bodies having a discharge opening, agitating means in the receptacle for agitating the ice bodies adjacent the discharge opening to promote free delivery of the ice bodies through the discharge opening during a dispensing operation, a closure member movably mounted adjacent said discharge opening for selectively closing the discharge opening, means for moving the closure means from said opening and concurrently energizing the agitating means to effect a delivery of ice bodies therethrough, and duct means for conducting delivered ice bodies from said opening to a dispense position, said duct means defining a removable chute, said discharge opening being accessible to a user's fingers upon removal of said removable chute, the improvement comprising:

interlock means having a first portion adjacent said closure member, and a second portion responsive to removal of said removable means of the duct means to cause said first portion to block movement of said closure member to prevent removal of the closure member from said opening thereby to prevent injury to said user's fingers by said agitating means during an attempted dispensing operation.

9. The ice maker structure of claim 8 wherein said interlock means second portion defines a means engaging said chute when the chute is installed in the ice maker structure to prevent said first portion from blocking movement of said closure member.

10. The ice maker structure of claim 8 including means for biasing said interlock means to block movement of said closure member.

11. The ice maker structure of claim 8 including weighted means for gravity biasing said interlock means to block movement of said closure member.

12. The ice maker structure of claim 8 including means pivotally mounting said interlock means, and means for pivotally biasing said interlock means to block movement of said closure member.

13. The ice maker structure of claim 8 including means pivotally mounting said interlock means to said duct means, and means for pivotally biasing said interlock means to block movement of said closure member.

14. The ice maker structure of claim 8 including means pivotally mounting said interlock means to said duct means, means for pivotally biasing said interlock means to block movement of said closure member, and spring means connected between said closure member and said duct means for biasing said closure member to close said discharge opening.

* * * * *